United States Patent
Sawyers-Abbott et al.

(10) Patent No.: US 12,385,419 B2
(45) Date of Patent: *Aug. 12, 2025

(54) OIL-COOLED CARBON SEAL

(71) Applicant: RTX Corporation, Farmington, CT (US)

(72) Inventors: Nigel David Sawyers-Abbott, South Glastonbury, CT (US); Armando Amador, Wethersfield, CT (US); Todd A. Davis, Tolland, CT (US)

(73) Assignee: RTX Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,862

(22) Filed: Sep. 11, 2023

(65) Prior Publication Data
US 2024/0003266 A1    Jan. 4, 2024

Related U.S. Application Data

(63) Continuation of application No. 17/320,593, filed on May 14, 2021, now Pat. No. 11,753,964, which is a
(Continued)

(51) Int. Cl.
*F01D 25/18* (2006.01)
*F01D 11/00* (2006.01)
(Continued)

(52) U.S. Cl.
CPC ............ *F01D 25/183* (2013.01); *F01D 11/00* (2013.01); *F01D 25/12* (2013.01); *F16J 15/162* (2013.01);
(Continued)

(58) Field of Classification Search
CPC ...... F16J 15/162; F16J 15/3404; F01D 25/12; F01D 25/183; F01D 11/00; F01D 25/20;
(Continued)

(56) References Cited

U.S. PATENT DOCUMENTS 3,578,343 A * 5/1971 Taschenberg ........... F16G 13/07
277/408
3,915,521 A * 10/1975 Young ..................... F16C 33/60
60/226.1
(Continued)

FOREIGN PATENT DOCUMENTS

EP    3382240 A1    10/2018
EP    3385511 A2    10/2018
(Continued)

OTHER PUBLICATIONS

European Search Report dated Mar. 19, 2020 for European Patent Application No. 19206047.3.
(Continued)

*Primary Examiner* — Christine M Mills
*Assistant Examiner* — L. Susmitha Koneru
(74) *Attorney, Agent, or Firm* — Bachman & LaPointe, P.C.

(57) ABSTRACT

A seal system has: a first member; a seal carried by the first member and having a seal face; and a second member rotatable relative to the first member about an axis. The second member has: a seat on a first piece of the second member, the seat having a seat face in sliding sealing engagement with the seal face; and a radially outwardly closed collection channel for collecting centrifuged oil; a second piece encircling and attached to the first piece and having a circumferential array of apertures; and cooperating with the first piece to define a plenum; and a flowpath from the collection channel passing radially outward axially spaced from the seat face to cool the seat face and passing axially away from the seat face in the plenum.

17 Claims, 9 Drawing Sheets

Related U.S. Application Data continuation-in-part of application No. 16/173,500, filed on Oct. 29, 2018, now Pat. No. 11,236,636.

(60) Provisional application No. 63/125,801, filed on Dec. 15, 2020.

(51) Int. Cl.
*F01D 25/12* (2006.01)
*F16J 15/16* (2006.01)

(52) U.S. Cl.
CPC ...... *F05D 2220/32* (2013.01); *F05D 2240/55* (2013.01); *F05D 2260/232* (2013.01)

(58) Field of Classification Search
CPC ........... F05D 2220/32; F05D 2260/232; F05D 2240/55; F02C 7/28
See application file for complete search history.

(56) References Cited

U.S. PATENT DOCUMENTS

| | | | | |
|---|---|---|---|---|
| 4,314,705 | A * | 2/1982 | Shimizu | F16C 33/74 277/346 |
| 4,406,459 | A * | 9/1983 | Davis | F16J 15/3404 277/401 |
| 4,406,460 | A * | 9/1983 | Slayton | F16J 15/3404 277/433 |
| 4,928,978 | A * | 5/1990 | Shaffer | F16J 15/162 277/401 |
| 5,464,227 | A * | 11/1995 | Olson | F16J 15/3404 277/400 |
| 6,099,243 | A * | 8/2000 | Fiore | F04D 29/128 415/206 |
| 7,861,530 | B2 | 1/2011 | Hawie et al. | |
| 9,719,373 | B2 | 8/2017 | Mart et al. | |
| 10,352,456 | B2 * | 7/2019 | Amador | F16J 15/342 |
| 10,767,510 | B2 | 9/2020 | Amador et al. | |
| 11,753,964 | B2 * | 9/2023 | Sawyers-Abbott | F16J 15/3404 277/403 |
| 2004/0026876 | A1 * | 2/2004 | Prinz | F04D 29/106 277/628 |
| 2006/0144622 | A1 * | 7/2006 | Bailey | E21B 47/10 175/230 |
| 2009/0189355 | A1 * | 7/2009 | Ueda | B29B 7/22 277/350 |
| 2009/0274548 | A1 * | 11/2009 | Joco | F16J 15/447 415/230 |
| 2014/0140824 | A1 * | 5/2014 | Sheridan | F01D 25/18 277/306 |
| 2017/0051632 | A1 * | 2/2017 | Lefebvre | F02C 7/06 |
| 2018/0045316 | A1 | 2/2018 | Kovacik et al. | |
| 2018/0087404 | A1 * | 3/2018 | Lighty | F01D 11/003 |
| 2020/0131936 | A1 | 4/2020 | Amador et al. | |
| 2020/0132196 | A1 * | 4/2020 | Davis | F01D 25/183 |
| 2021/0115812 | A1 * | 4/2021 | Siw | F01D 11/003 |
| 2021/0156306 | A1 * | 5/2021 | Peters | F01D 25/183 |
| 2022/0025776 | A1 * | 1/2022 | Sawyers-Abbott | F01D 25/12 |
| 2022/0049624 | A1 * | 2/2022 | Sawyers-Abbott | F02C 7/06 |

FOREIGN PATENT DOCUMENTS

| | | |
|---|---|---|
| EP | 3428405 A2 | 1/2019 |
| EP | 3647634 A1 | 5/2020 |
| EP | 3702586 A1 | 9/2020 |

OTHER PUBLICATIONS

US Office Action dated Jun. 10, 2021 for U.S. Appl. No. 16/173,500.
European Search Report dated Jun. 30, 2022 for European Patent Application No. 21214893.6.
US Office Action dated Jan. 13, 2023 for U.S. Appl. No. 17/320,593.

* cited by examiner

OIL-COOLED CARBON SEAL

CROSS-REFERENCE TO RELATED APPLICATIONS

This is a continuation of U.S. patent application Ser. No. 17/320,593 (the '593 application), filed May 14, 2021, by Nigel David Sawyers-Abbott et al., and entitled "Oil-Cooled Carbon Seal", which claims benefit of U.S. Patent Application No. 63/125,801 (the '801 application), filed Dec. 15, 2020, by Nigel David Sawyers-Abbott et al., and entitled "Oil-Cooled Carbon Seal", and which '593 application is a continuation-in-part of Ser. No. 16/173,500 (the '500 application), filed Oct. 29, 2018, by Armando Amador et al., and entitled "Oil-Cooled Carbon Seal", now U.S. Pat. No. 11,236,636, the disclosures of which applications are incorporated by reference herein in their entireties as if set forth at length.

BACKGROUND

The disclosure relates to gas turbine engines. More particularly, the disclosure relates to cooling of carbon seals in gas turbine engines.

Carbon seals are commonly used to seal between relatively rotating components in gas turbine engines. In typical situations, the annular carbon seal is spring biased into engagement with an annular seat (typically metallic such as a steel). Often, the carbon seal is on non-rotating static structure and the seat rotates with one of the engine shafts. The sliding engagement causes frictional heating. The heat must be dissipated. With a rotating seat, it is common to use oil cooling. Generally, oil-cooled carbon seals are divided into two categories: "dry face" seals wherein the oil passes through passageways in the seat without encountering the interface between seal face and seat face; and "wet face" seals wherein the oil passes through the seat to the interface so that the oil that flows through the seat cools the seat but then lubricates the interface to further reduce heat generation.

For both forms of seals, the oil may be delivered through a nozzle and slung radially outward by the rotating component and collected in a radially outwardly closed and inwardly open collection channel from which the passageways extend further radially outward.

U.S. Pat. No. 4,406,459 (the '459 patent), Davis et al., Sep. 27, 1983, "Oil Weepage Return for Carbon Seal Plates" shows a seal with two sets of passageways through the seat. One set delivers oil to the interface as a wet face seal. Another set helps centrifugally pump out oil that has weeped radially inward from the interface.

U.S. Pat. No. 4,928,978 (the '978 patent), Shaffer et al., May 29, 1990, "Rotating shaft seal" shows an alternative wet face seal.

United States Patent Application Publication 20180045316A1 (the '316 publication), Kovacik et al., Feb. 15, 2018, "Hydrodynamic Seal Seat Cooling Features" shows a dry face seal wherein the oil passageways have two legs: an upstream leg receiving oil from a collection notch which in turn has collected the oil from a nozzle; and a downstream leg extending radially outward from the upstream leg generally close to and parallel to the sealing interface.

SUMMARY

One aspect of the disclosure involves a seal system comprising: a first member; a seal carried by the first member and having a seal face; and a second member rotatable relative to the first member about an axis. The second member has: a seat on a first piece of the second member, the seat having a seat face in sliding sealing engagement with the seal face; a radially outwardly closed collection channel for collecting centrifuged oil; and a second piece encircling and attached to the first piece. The second piece has a circumferential array of apertures and cooperates with the first piece to define a plenum. A flowpath from the collection channel passes radially outward axially spaced from the seat face to cool the seat face and passes axially away from the seat face in the plenum.

A further embodiment of any of the foregoing embodiments may additionally and/or alternatively include the flowpath passing through a plurality of passageway legs in the first piece.

A further embodiment of any of the foregoing embodiments may additionally and/or alternatively include the flowpath passing from the passageway legs in the first piece through an annular channel in the first piece and to the plenum.

A further embodiment of any of the foregoing embodiments may additionally and/or alternatively include the passageway legs being first passageway legs, the flowpath passing from the first passageway legs and through respective associated second passageway legs in the first piece and to the plenum.

A further embodiment of any of the foregoing embodiments may additionally and/or alternatively include the second passageway legs having respective spiral surface enhancements.

A further embodiment of any of the foregoing embodiments may additionally and/or alternatively include the second passageway legs being threaded.

A further embodiment of any of the foregoing embodiments may additionally and/or alternatively include the seal being a carbon seal.

A further embodiment of any of the foregoing embodiments may additionally and/or alternatively include the seat being steel and/or the seat and seal being full annular.

further embodiment of any of the foregoing embodiments may additionally and/or alternatively include a gas turbine engine including the seal system and/or wherein the second member is a shaft.

A further embodiment of any of the foregoing embodiments may additionally and/or alternatively include the seal system further comprising an oil source positioned to introduce oil to the passageway legs.

A further embodiment of any of the foregoing embodiments may additionally and/or alternatively include a method for using the seal system. The method comprises relatively rotating the second member to the first member about the axis, the rotation centrifugally driving a flow of oil along the flowpath to cool the seat face.

A further embodiment of any of the foregoing embodiments may additionally and/or alternatively include spraying the oil from a nozzle.

A further embodiment of any of the foregoing embodiments may additionally and/or alternatively include an oil source positioned to introduce oil to the passageway legs.

A further embodiment of any of the foregoing embodiments may additionally and/or alternatively include the seal system being a dry face seal.

A further embodiment of any of the foregoing embodiments may additionally and/or alternatively include the sprayed oil being centrifugally collected in a radially outwardly closed channel from which the passageway legs extend.

Another aspect of the disclosure involves a seal system comprising: a first member comprising a seal with a seal face; and a second member comprising a seat with a seat face and a plurality of cooling passageways. The second member is rotatable about an axis relative to the first member. The seal face and the seat face are in sliding sealing engagement. The cooling passageways have respective surface enhancements.

A further embodiment of any of the foregoing embodiments may additionally and/or alternatively include each cooling passageway surface enhancement being at least one spiral.

A further embodiment of any of the foregoing embodiments may additionally and/or alternatively include each cooling passageway surface enhancement being a thread.

A further embodiment of any of the foregoing embodiments may additionally and/or alternatively include: the second member further having a collection channel; and the second member further having a plurality of feed passageways, each feed passageway coupling an associated said cooling passageway to the collection channel.

A further embodiment of any of the foregoing embodiments may additionally and/or alternatively include each said feed passageway being positioned at an oblique angle relative to both the collection channel and the associated cooling passageway.

A further embodiment of any of the foregoing embodiments may additionally and/or alternatively include the second member being coupled to and configured to rotate with a rotatable shaft, and the first member being configured to remain stationary while the second member rotates with the rotatable shaft.

A further embodiment of any of the foregoing embodiments may additionally and/or alternatively include the seal system including between 10 and 100 cooling passageways and between 10 and 100 feed passageways.

A further embodiment of any of the foregoing embodiments may additionally and/or alternatively include: a distance between an outermost edge of the grooves of the threaded passageway and the seat face being between 0.76 mm and 6.35 mm; and an angle formed between a center axis of each cooling passageway and the seat face being greater than zero.

A further embodiment of any of the foregoing embodiments may additionally and/or alternatively include the seal system being a dry face seal and the feed passageways and cooling passageways being configured to provide cooling fluid such that the cooling fluid remains separate from an interface where the seal face and the seat face are in sliding engagement.

A further aspect of the disclosure involves a method for manufacturing the seal system. The method comprises: forming a precursor of the second member; and forming of the surface enhancements by at least one of tapping and EDM.

A further embodiment of any of the foregoing embodiments may additionally and/or alternatively include forming precursors of the cooling passageways by drilling.

A further embodiment of any of the foregoing embodiments may additionally and/or alternatively include a method for using the seal system. The method comprises: rotating the second member about the axis relative to the first member; the rotation driving respective flows of fluid through the passageways; and the flows cooling the second member.

A further embodiment of any of the foregoing embodiments may additionally and/or alternatively include the surface enhancements being spiral enhancements and the spiral enhancements inducing swirl of the respective flows in the passageways.

A further embodiment of any of the foregoing embodiments may additionally and/or alternatively include a gas turbine engine comprising: an engine case, a fan, a compressor section, a turbine section, a rotating shaft; and the seal system positioned within the gas turbine engine (e.g., within the compressor section of the gas turbine engine).

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
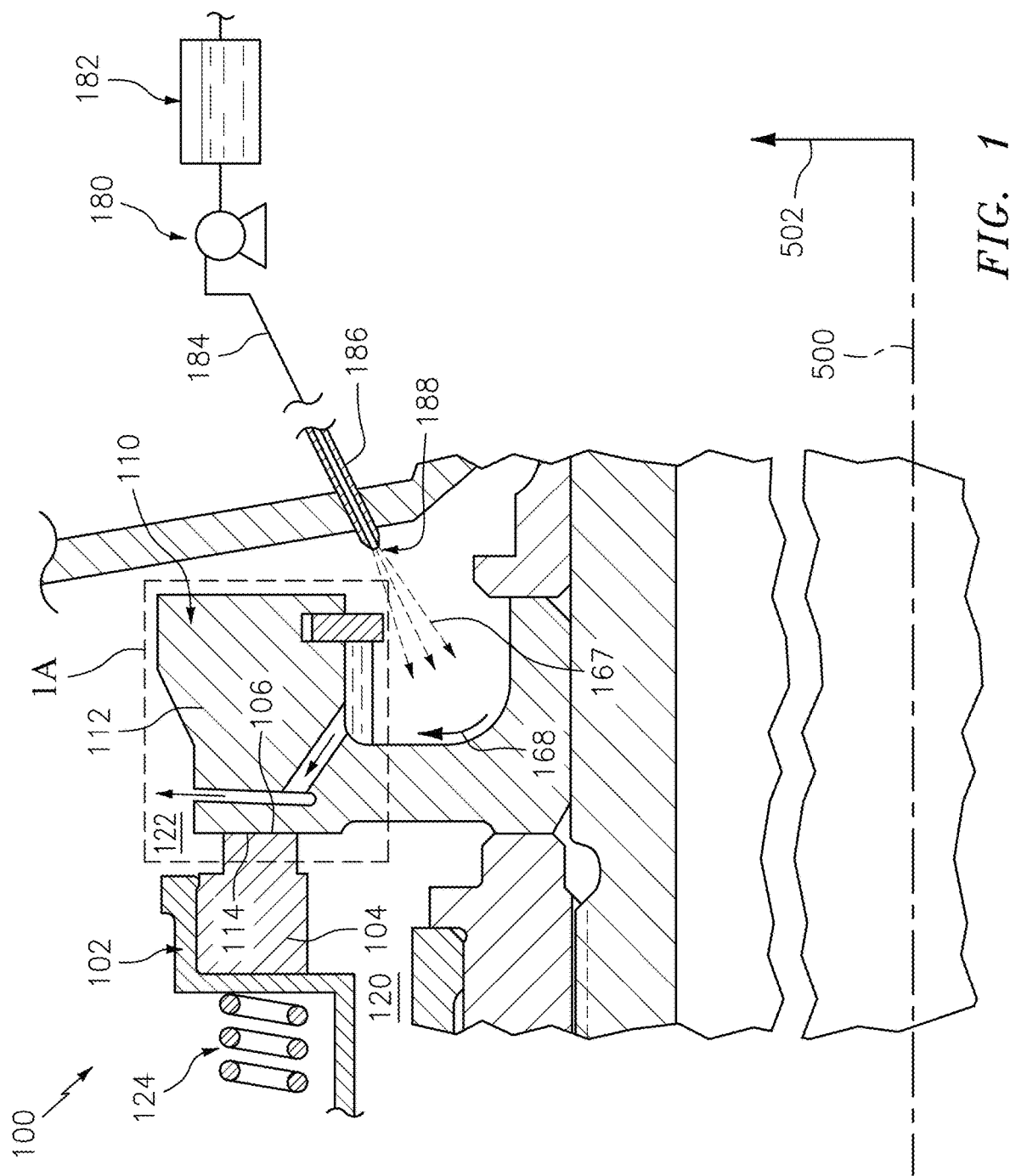
FIG. 1 is a partial partially schematic central axial sectional view of a first seal system.

FIG. 1 shows a seal system 100 having a first member 102 carrying a seal 104. The example seal 104 is a carbon seal having a seal surface or face 106. The example seal 104 is formed as a body of revolution about an axis 500 which is an axis of relative rotation between the first member 102 and a second member 110. FIG. 1 further shows an outward radial direction 502. The example seal face 106 is a radial face. The second member 110 comprises a piece 112 (seat piece) forming a seat for the seal with a seat surface or face 114 in sliding sealing engagement with the seal face 106 at a sealing interface.

The example illustrated configuration is a dry face configuration. The seal 104 may be biased into axially compressive engagement with the seat face 114 via one or more factors including pressure bias and spring loading. The seal 104 is shown as sealing a space or region 120 inboard of the sealing interface from a space or region 122 outboard. Depending upon configuration, the pressure difference may bias the seal in either direction. FIG. 1 further shows a spring 124 (e.g., a coil spring) providing the required bias. There may be a circumferential array of such springs about the axis 500 each under axial compression.

In one group of examples discussed below, the second member 110 is rotating in an inertial frame of reference while the first member 102 is either stationary or counter-rotating. The rotating of the second member 110 may create a centrifugal oil flow action discussed further below.

Figure 1A:
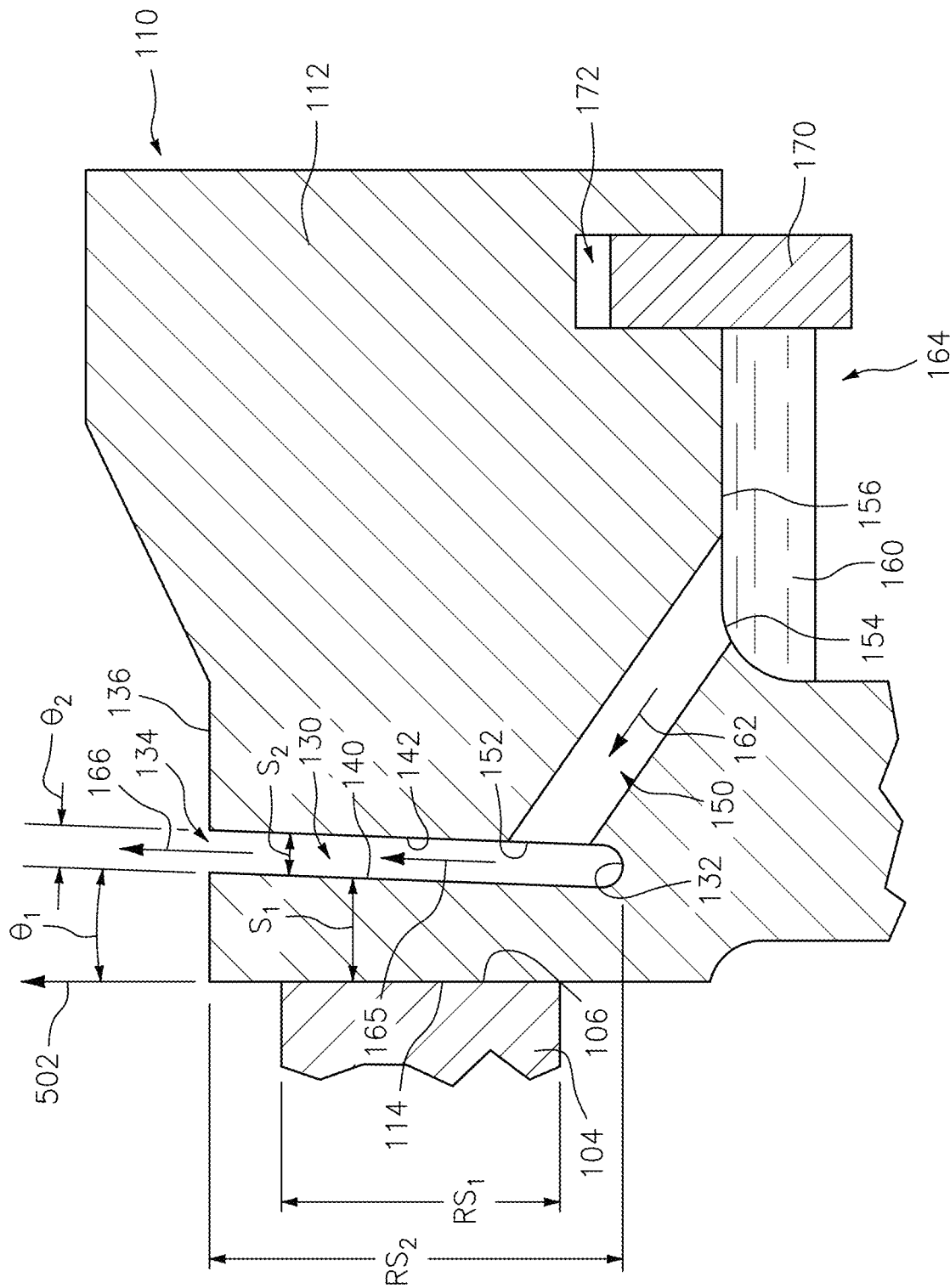
FIG. 1A is an enlarged view of a sealing interface area of the seal system of FIG. 1.

In operation, the relative rotation produces frictional heating at the sliding interface between the faces 106 and 114. Cooling to dissipate this heat is therefore desirable. As discussed above, it is well-known to provide a circumferential array of oil flow passages through a seat. These are typically drilled after machining gross features of the seat. FIG. 1A, however, shows the seat piece 112 as having an annular channel 130 axially spaced from the seat face 114. The example annular channel extends from a radially inboard inner diameter (ID) base 132 to a radially outboard outer diameter (OD) opening 134 in an OD surface 136 of the seat piece 112. The channel 130 also has a first surface or face 140 and a second surface or face 142 axially spaced therefrom. The channel 130 may be machined in the piece 112 by conventional methods, such as turning or milling, or advanced methods, such as EDM.

FIG. 1A further shows a circumferential array of passageway legs (passageways or feed passageways) 150 (e.g., drilled right circular cylindrical passageways) connected to the annular channel 130 at respective first ends 152 and open to a surface portion 156 of the piece 112 at their second ends 154. An example number of passageways 150 is 10 to 100, more particularly 20 to 80 or 25 to 55 in seal sizes used on gas turbine engines. In operation, centrifugal action causes an accumulation 160 of oil to be captured by the second member 110 in a radially outwardly closed collection channel 164. The passageway second ends 154 form outlets from the collection channel allowing oil flows 162 to pass outward through the passageways to the channel 130. The flows 162 from the individual passageways 150 merge to form a flow 165 in the channel 130. The flow 165 flows radially outward to be discharged as a discharge flow 166. The radial oil flow 165 in the channel cools the seat piece 112 and, thereby, cools the seat face and seal face.

The example feed passageways 150 are shown oblique to both the axial and radial directions to reduce abrupt flow transitions (e.g., relative to an alternative where they extended axially from the collection channel where there would be an abrupt transition to the channel 130).

To form the channel 164, FIG. 1A shows a weir formed by an annular member 170 accommodated partially in a radially inwardly open channel 172 in the seat piece 112. A portion of the member 170 protrudes radially inwardly from an opening of the channel 172 at the surface 156. As an oil source, FIG. 1 shows an oil pump 180 delivering oil from a reservoir 182 via a conduit 184. The conduit 184 may terminate at one or more nozzles 186. Each nozzle may have a respective outlet 188 discharging a spray 167 of the oil. The sprayed oil collects on a surface of the first member and is slung radially outward as a flow 168 (FIG. 1) to the channel 164. Oil from the flow 166 may be collected and returned to the reservoir 182 by a conventional collection apparatus (not shown).

FIG. 1A further shows the seat face 106 having a radial span $RS_1$ and the channel 130 as having a radial span $RS_2$. The example radial spans are oriented so that the channel 130 fully radially overlaps the seal face 106. This provides a short thermal conductive flowpath for heat to pass from the seat face 114 to the flow 165 in the channel 130. FIG. 1A further shows an angle $\theta_1$ between the seal face/seat face on the one hand and the adjacent channel face 140 on the other hand. Example $\theta_1$ is greater than zero. More particularly, with the seal face extending exactly or close to exactly radially, the adjacent portion of the channel face 140 diverges at the angle $\theta_1$ in the radial outward direction. This divergence from radial helps cause the flow 165 to remain attached to the face 140. The opposite inclination would potentially risk flow separation and loss of heat conduction. Example $\theta_1$, however, may be fairly small in order to maintain cooling effectiveness as the flow 165 progresses radially outward toward the outer diameter (OD) extent of the seal face. Thus, example $\theta_1$ is 0-30.0°, more particularly, 0-12.0°, 0.5-10.0°, or 1.0-10.0° or 2.0-8.0°. The second face 142 may similarly diverge from the first face at an angle $\theta_2$. But this divergence $\theta_2$ may represent an artifact of manufacturing such as from a tapered bit. Example $\theta_2$ is 0° to 30.0°, more particularly 0° to 15.0° or 0° to 10.0° or 0° to 5.0°. Alternative lower ends on those ranges are 1.0° and 3.0°. Example span $S_1$ between the seat face 114 and the channel face 140 is 0.030 inch to 0.250 inch (0.76 mm to 6.35 mm), more narrowly 2.0 mm to 6.0 mm or 2.5 mm to Example channel width $S_2$ is 0.030 inch to 0.250 inch (0.76 mm to 6.35 mm), more narrowly 1.0 mm to 6.0 mm or 2.0 mm to 6.0 mm or 2.5 mm to 5.0 mm.

An example member 170 may be formed by spiral winding such as used for retaining rings. Alternatively, a weir may be integrally machined into seat piece 112.

In various implementations, the use of the annular channel 130 may have one or more of several advantages relative to any particular baseline. For example, when contrasted with a baseline arrangement as in the '316 publication, the channel 130 may provide more circumferential uniformity of cooling which may help reduce heat generation and wear. For example, discrete passages may produce a circumferential array of cool zones interspersed with warmer zones. The differential thermal expansion of cool portions of the seat and hot portions of the seat may produce an uneven seat surface generating unnecessary heat and potentially compromising sealing.

Figure 2:
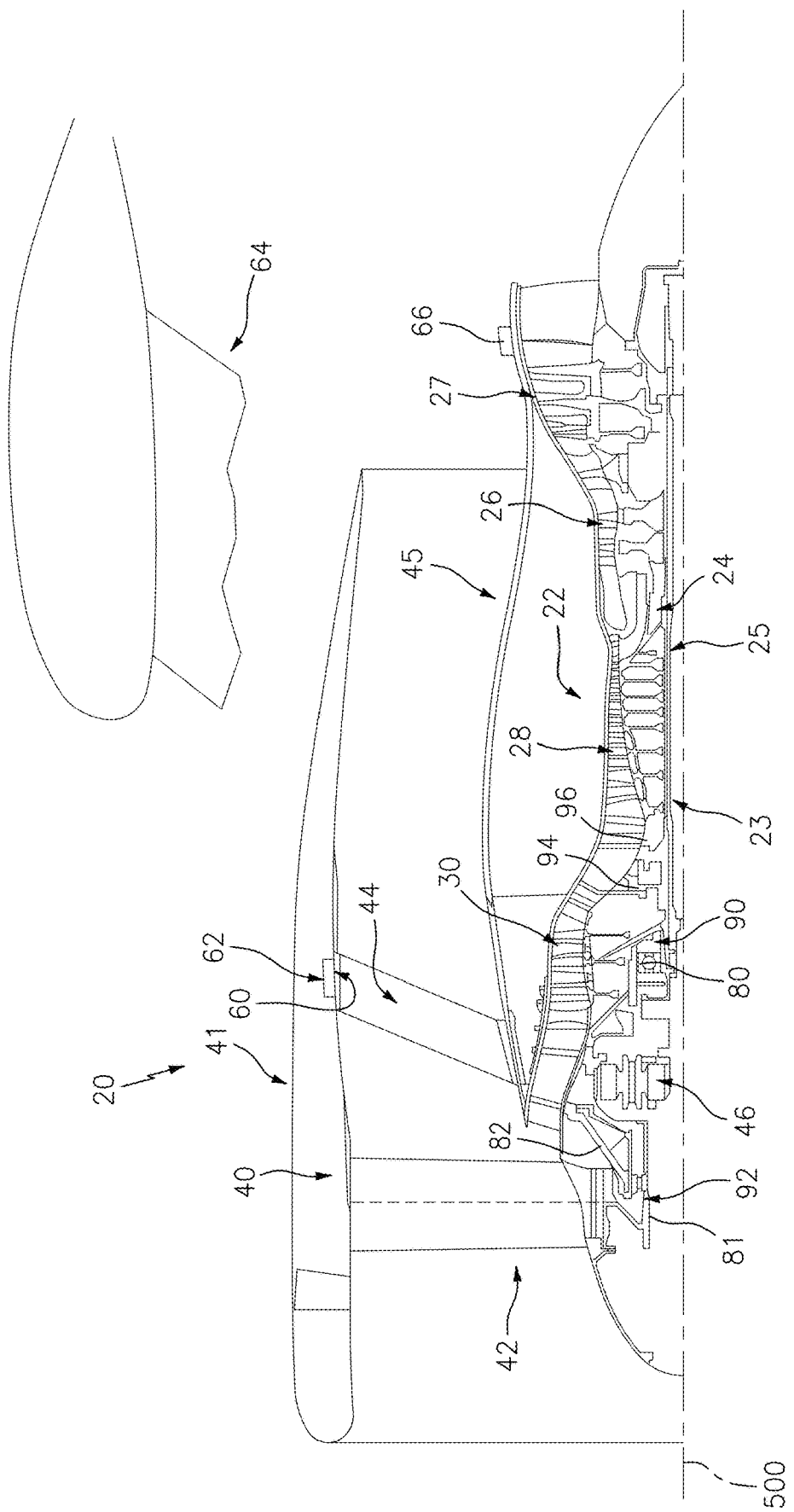
FIG. 2 is a partially schematic central axial sectional view of a gas turbine engine.

FIG. 2 shows a turbofan engine 20 having an engine case 22 containing a rotor shaft assembly 23. An example engine is a turbofan. Alternatives include turbojets, turboprops, turboshafts, and industrial gas turbines. The example turbofan is a two-spool turbofan. Via high 24 and low 25 shaft portions of the shaft assembly 23, a high pressure turbine (HPT) section 26 and a low pressure turbine (LPT) section 27 respectively drive a high pressure compressor (HPC) section 28 and a low pressure compressor (LPC) section 30. The engine extends along a longitudinal axis (centerline) 500 from a fore end to an aft end. Adjacent the fore end, a shroud (fan case) 40 encircles a fan 42 and is supported by vanes 44. An aerodynamic nacelle 41 around the fan case is shown and an aerodynamic nacelle 45 around the engine case is shown.

Although a two spool (plus fan) engine is shown, an alternative variation involves a three spool (plus fan) engine wherein an intermediate spool comprises an intermediate pressure compressor (IPC) between the LPC and HPC and an intermediate pressure turbine (IPT) between the HPT and LPT. In another aspect a three-spool engine, the IPT drives a low pressure compressor while the LPT drives a fan, in both cases either directly or indirectly via a transmission mechanism, for example a gearbox.

In the example embodiment, the low shaft portion 25 of the rotor shaft assembly 23 drives the fan 42 through a reduction transmission 46. An example reduction transmission is an epicyclic transmission, namely a planetary or star gear system.

FIG. 2 also shows at their outboard ends, the vanes 44 have flanges 60 bolted to an inner ring structure of the fan case to tie the outboard ends of the vanes together. Integral therewith or fastened thereto is a forward mounting structure 62 (e.g., devises which form part of a four bar mechanism) and provides forward support to the engine (e.g., vertical and lateral support). To mount the engine to the aircraft wing, a pylon 64 is mounted to the structure 62 (e.g., forming the outer part thereof). The pylon is also mounted to a rear engine mount 66.

In one example, FIG. 2 shows a location 90 for the seal system 100 wherein the first member 102 may be mounted to (or integrally formed with) a static bearing support 80 and the second member 110 may be mounted to (or integrally formed with) a forward portion of the low shaft 25. Alternatively, in a location 92, the first member 102 may be mounted to (or integrally formed with) a static hub 82 and the second member 110 mounted to (or integrally formed with) a fan shaft 81. In these two illustrated examples, the seal system is positioned adjacent one end of a bearing system to isolate the bearing system. Similar locations may be provided for other bearings in the engine. For example, locations 94 and 96 may represent locations where the sealing is between the high spool and static structure on either side of a bearing supporting the high spool.

Figure 3:
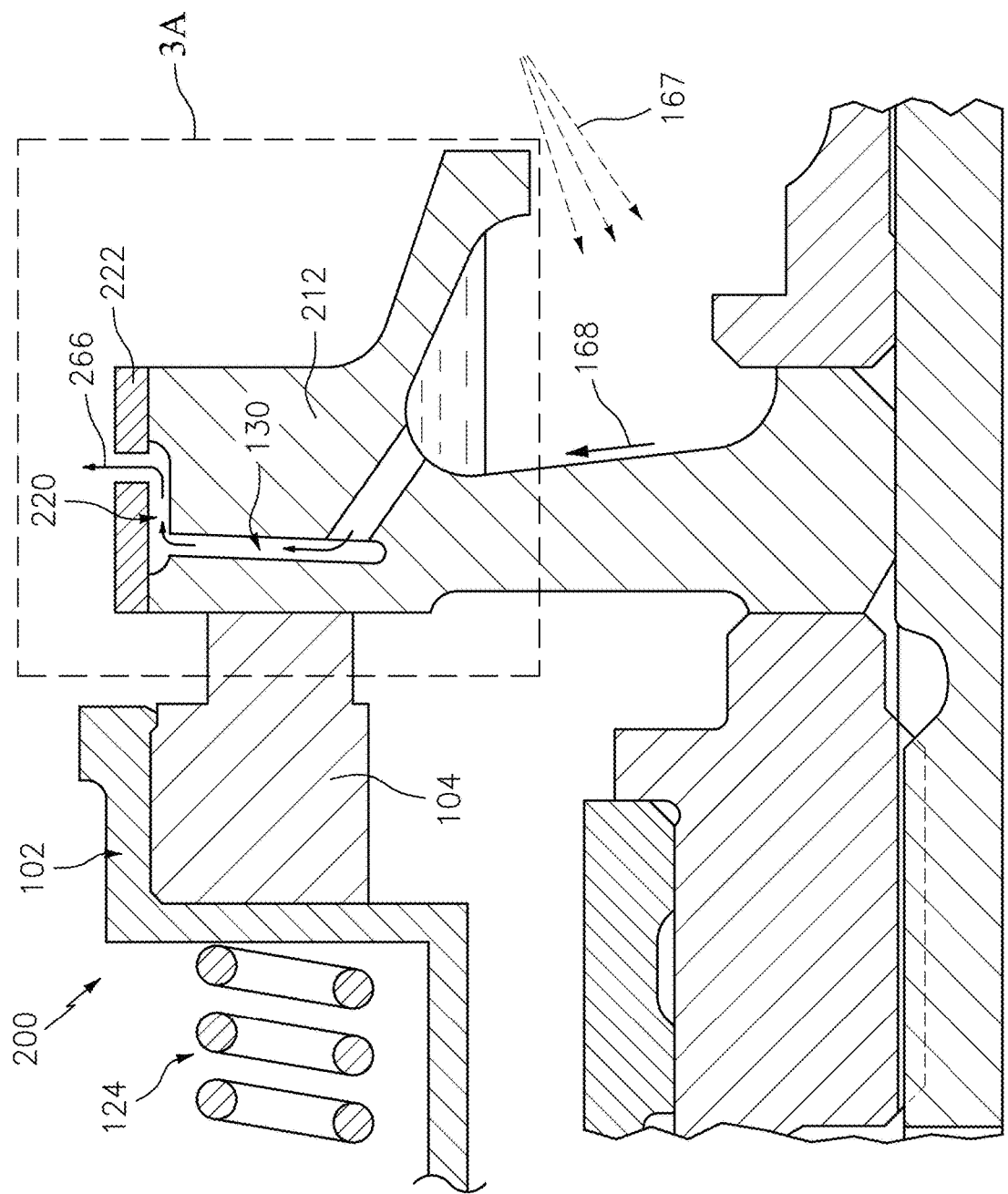
FIG. 3 is a partial partially schematic central axial sectional view of a second seal system.
Figure 3A:
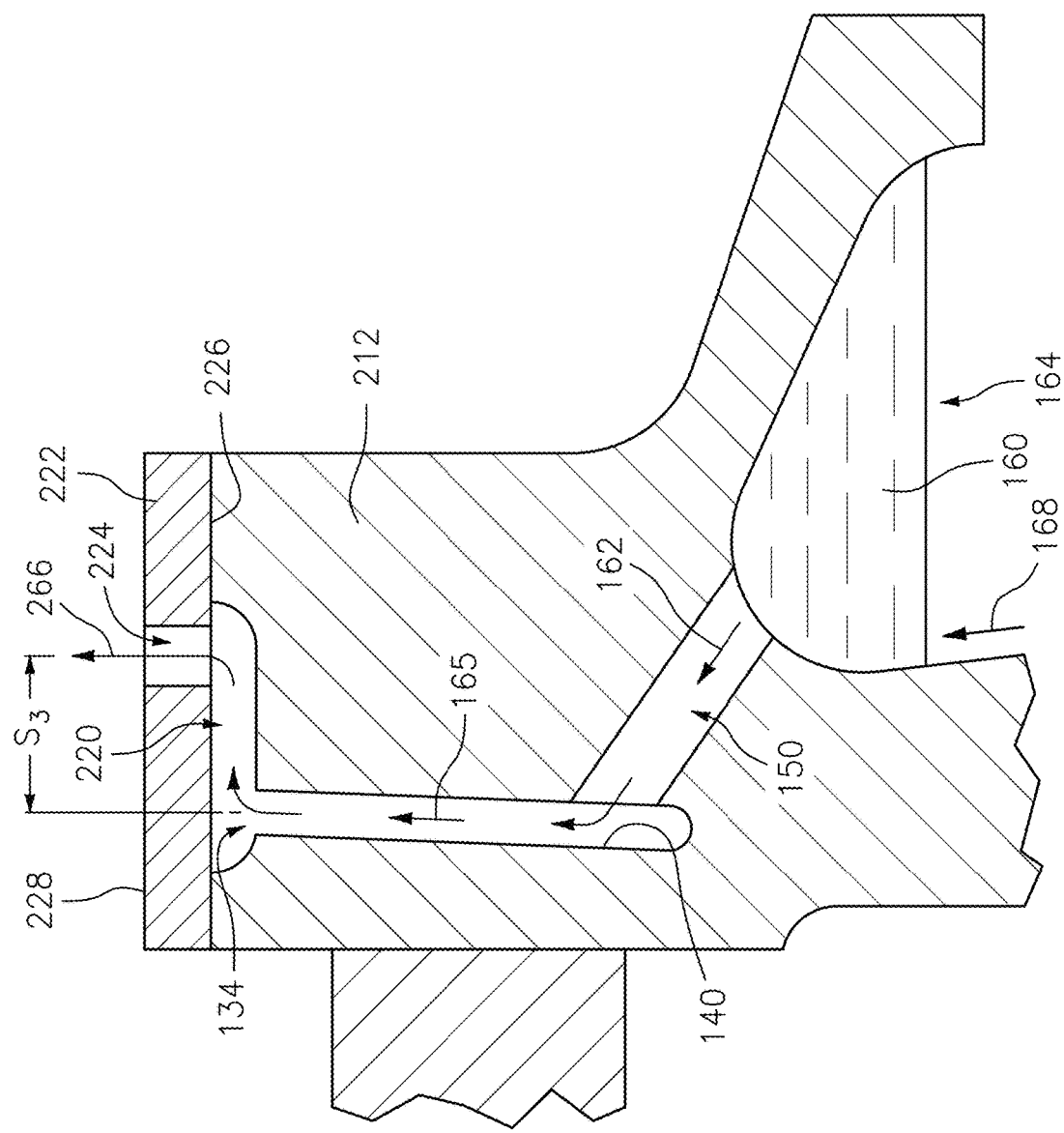
FIG. 3A is an enlarged view of a sealing interface area of the second seal system of FIG. 3.

FIG. 3 shows an alternate seal system 200 configuration, otherwise similar to FIG. 1 with several exceptions. A first exception is that the cooling channel 130 extends radially outward to a plenum 220 (FIG. 3A). The plenum 220 is defined by the combination of: a further annular channel in a first seat piece 212; and a second piece 222 encircling and attached to the first piece. The example second piece 222 is formed as an annular sleeve having a circumferential array of apertures 224 extending between an inner diameter (ID) surface 226 and an outer diameter (OD) surface 228. The apertures (e.g., drilled holes) form plenum outlets. The ID surface is engaged to the OD surface of the first seat piece 212 fore and aft of the plenum 220 (e.g., via interference fit or a braze joint). Alternative configurations may have the second piece 222 as nondestructively removable from the first piece such as via a retaining clip or wire (e.g. snap ring). Similarly, in such removable configurations, separate seals may be provided between the pieces (e.g., O-rings).

The apertures 224 are axially offset from the outer diameter opening of the channel 130 to the plenum 220. An example number of apertures 224 is 10 to 100, more particularly 20 to 80 or 25 to 55 in seal sizes used on gas turbine engines. The plenum 220 and apertures 224 may provide one or more of several functions. First, the apertures may provide a metering function (metering/restricting discharge flows 266) helping ensure the flow has sufficient residence time in the channel 130 to not separate from the face 140 and to provide sufficient cooling. Additionally, residence time in the plenum 220 may further cool the first seat piece 212 to maximize the cooling. The axial offset of the apertures 224 from the outlet or OD end of the channel 134 helps ensure that flow is along the length of the plenum 220 to again maximize cooling efficiency. Example offset $S_3$ (measured center-to-center) is inches to 0.50 inches (0.0 mm to 12.7 mm), more particularly, 0.00 inches to 0.30 inches (0.0 mm to 7.6 mm) or, for non-zero values 0.10 inch to 0.30 inch (2.5 mm to 7.6 mm) or inch to 0.50 inch (2.5 mm to 12.7 mm).

A further difference between the FIG. 3 and FIG. 1 systems is the FIG. 3 presence of an integral weir formed in the first piece. This may be more representative of conventional weirs.

The plenum 220 could be used with seats having multiple radial passageways 300 (FIG. 4, e.g., a circumferential array of passageways) rather than a single continuous annular passageway 130. The example passageways 300 may be drilled circular holes. Each example passageway 300 has an inlet 302 at the end 152 of a respective associated one of the passageways 150 (feed passageways). The inlet 302 may be at or near an inner diameter (ID) end 304 of the passageway. The passageway has an outer diameter end 306 forming a passageway outlet. The example inlet is in a lateral surface 308 of the passageway.

Passageway radial span $RS_1$ and angle $\theta_1$ may be as discussed above for the FIGS. 1 and 3 embodiments. The passageway count may also be similar. However, it is also possible that the angle $\theta_1$ have negative values that actually converge toward the radial direction and face 114 in the outward radial direction.

An example diameter of the passageways 300 may be at least 0.060 inch (0.152 centimeters). For example, it may be an example 0.060 inch (0.152 centimeters) to 0.30 inch (0.762 centimeter). The diameter may be the same or less than the diameter of the passageways 150 dependent on the cooling needs. This may allow maintenance of flow along the passageway 300 surface. The larger cross-sectional area of the feed passageway 150 helps provide sufficient oil. However, the further restriction provided by the plenum outlets may help maintain surface contact along the radial span of the passageways 300. Thus, the plenum outlets 224 may be smaller in number and/or individual cross-sectional area than the passageways 300. Thus, total plenum cross-sectional area may be smaller than total passageway 300 cross-sectional area. A proximity of the surface of the passageway 300 to the seat face may be of similar span to that $S_1$ of the channel noted above. Manufacture may be via conventional means as noted above with drilling of the feed passageways and cooling passageways into a cast and/or machined precursor of the seat.

Figure 4:
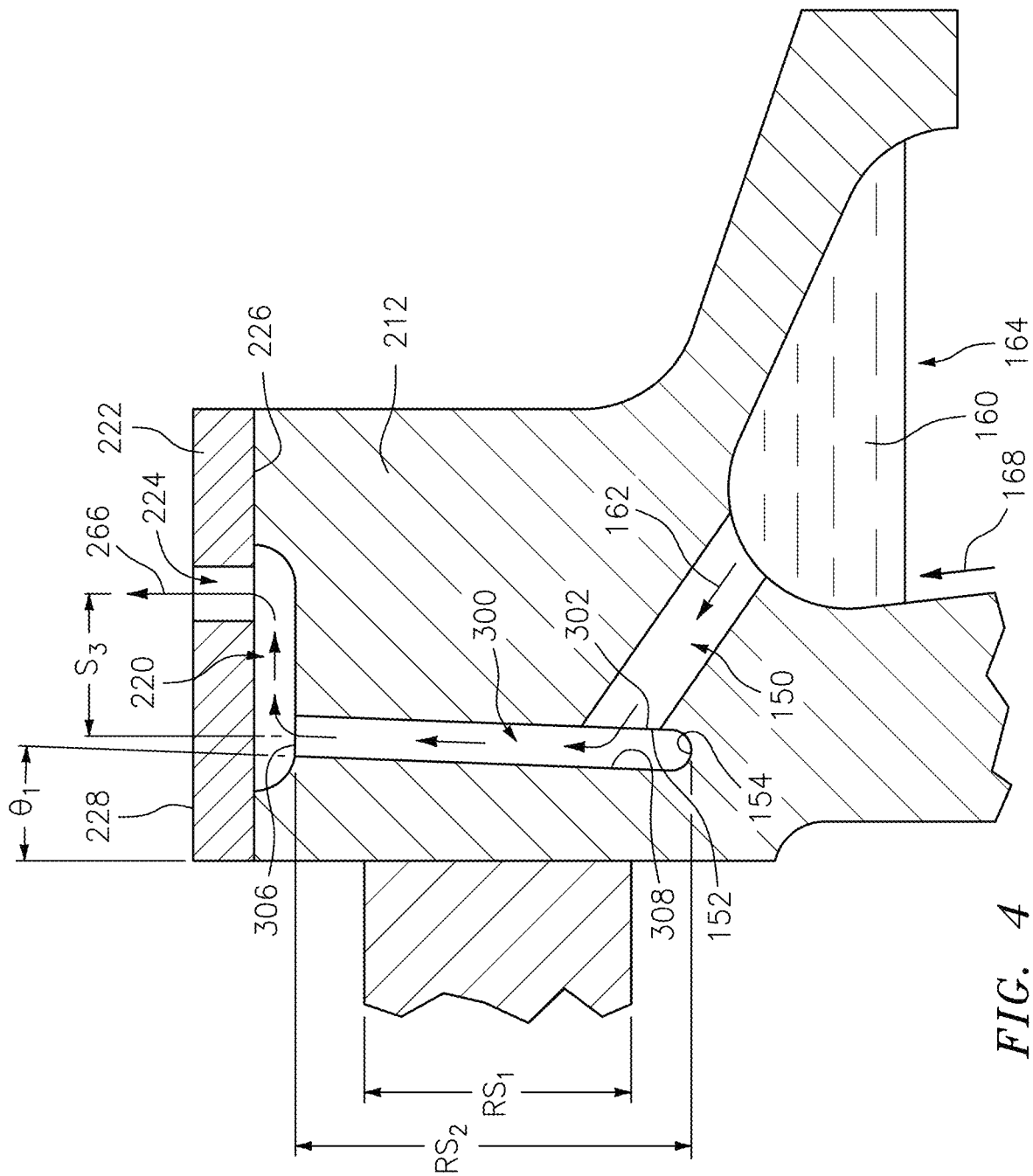
FIG. 4 is an enlarged central axial sectional view of a third sealing system.

Although the example FIG. 4 embodiment is based upon the FIG. 3 configuration having an integral weir, alternative embodiments could be made based upon other seat configurations including the separate weir of FIG. 1. Similarly, the plenum 220 could be added to yet other configurations of passageways. For example, they may include passageways with a partially tangential orientation such as those of the '316 publication noted above.

However, to increase heat transfer to the flows through the passageways, the passageways may have surface-enhanced passageway cross-sections. The surface enhancements increase the surface area for a given passage cross-sectional area or transverse linear dimension. Examples include splined or fluted cross-sections, and the like. Such surface-enhanced passageways could be formed by techniques such as plunge electrodischarge machining (EDM). Such EDM may be done after drilling a pilot hole or without a pilot hole.

In addition to cylindrical surface-enhanced passageways (e.g., ridges such as straight splines or fluting (not shown) separated by straight grooves or channels), other enhancements may take other forms such as passageways 320 (FIG. 5) having a spiral enhancement 322 (ridge(s) or projection(s)) leaving groove(s) or recess(es)/channel(s) between projections or turns of a projection. The example spiral enhancement is spiral/helical splines or fluting shown with a relatively high helix angle $\theta_3$ (a ramping helix angle vs. an off-axial helix angle of $90°-\theta_3$) that imparts swirl to the fluid flowing radially outward. An example of $\theta_3$ is broadly 20.0° to 88.0°, more narrowly 45.0° to 88.0° or 70.0° to 88.0° for EDM-formed enhancements. The swirl may help keep the surface of the passageway 320 wetted for high heat transfer and residence time for improved heat absorption.

Figure 5:
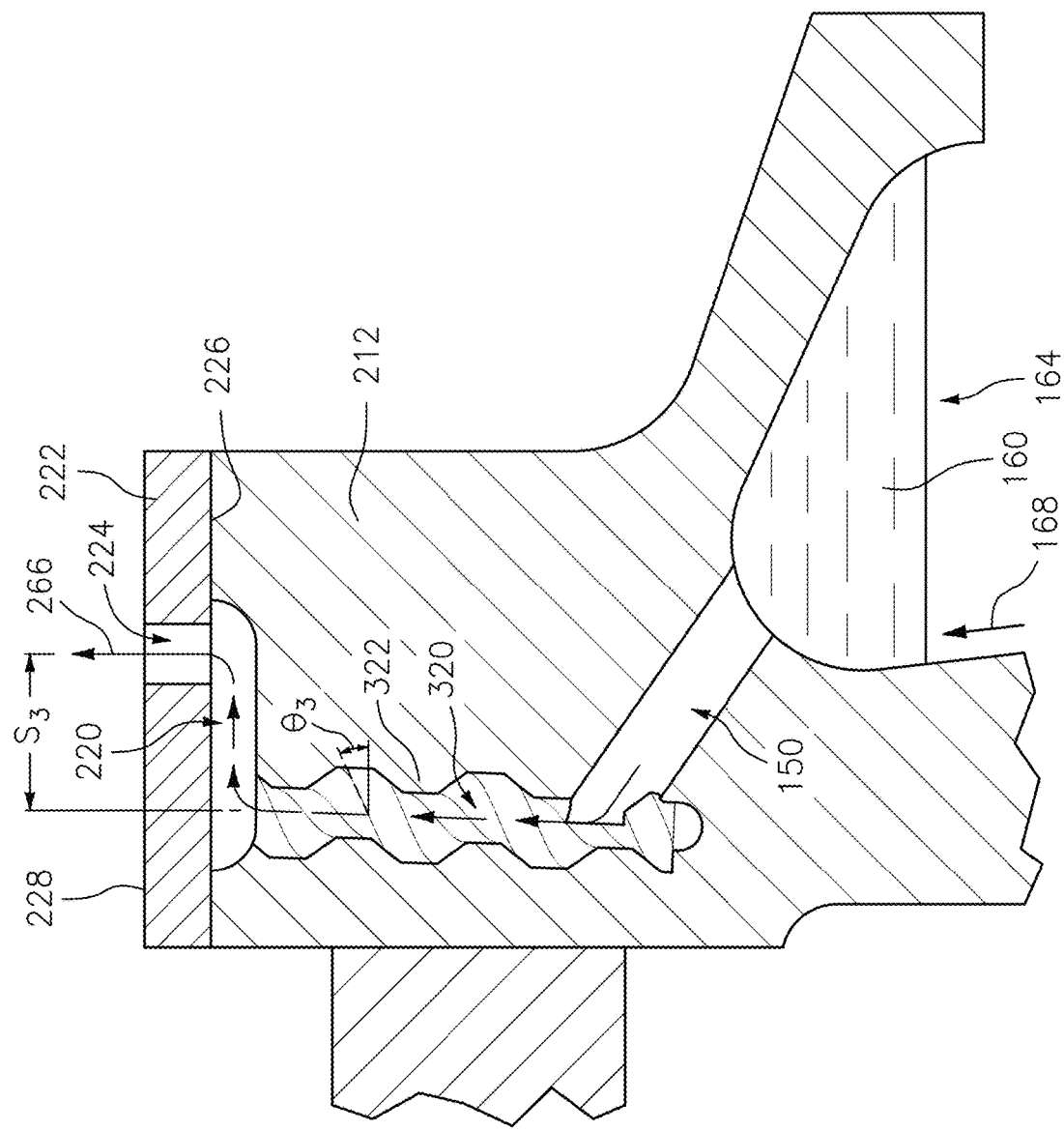
FIG. 5 is an enlarged central axial sectional view of a fourth sealing system.

Such enhancements may, for example, be made via plunge EDM (after pre-drilling of a pilot hole or without pilot hole) with a rotation of the EDM electrode during the plunge. FIG. 5 shows the enhancements 322 as including a plurality of alternating ridges/projections and grooves/recesses when viewed in axial section of the passageway. The spiral is shown schematically, particularly its intersection with the passageway 150. An example spiral ridge/projection count per passageway is four to twenty, more particularly four to ten. Count will generally be geometrically related to the helix angle and projection/groove width. Example projection height (radial difference relative to passageway axis of projection apex and recess base) is 5.0% to 30.0% of the radius at the groove base, more narrowly 10.0% to 25%. A proximity of the surface of the passageway 320 to the seat face (e.g., measured from the adjacent location on the groove base) may be of similar span to that $S_1$ of the channel noted above.

For the example surface-enhanced passageways, the passageway cross-sectional area (or minimum passageway cross-sectional area if there is lengthwise/streamwise variation) may be the same in absolute and relative terms as that noted above for the passageway 300.

Figure 6:
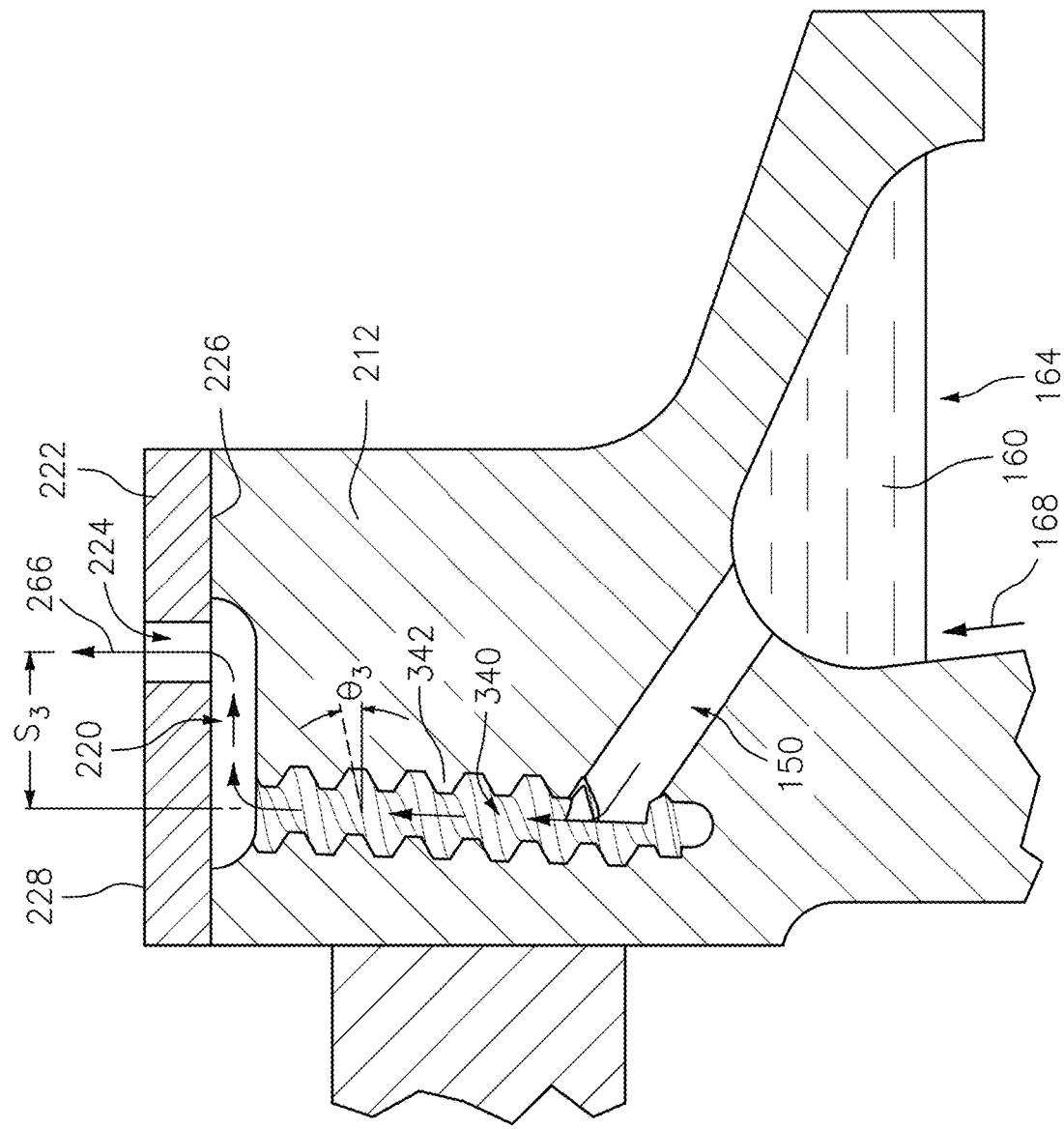
FIG. 6 is an enlarged central axial sectional view of a fifth sealing system.

Alternative spiral feature(s) include relatively low helix angle features such as thread(s). FIG. 6 shows passageway 340 with such a thread 342. Potential threads include single-lead threads, multiple lead threads, and so forth. Manufacture techniques include drilling and tapping or, as noted above, EDM. Again, viewed in section, the one or more threads appear as a series of ridges/projections and grooves/recesses. The thread(s) may have a relatively low helix angle $\theta_3$ such as found in typical common thread forms 2.0° to 15.0° or 4.0° to 12.0°. Thread height may be as described for the FIG. 5 spiral enhancement.

Example threads are coarse threads wherein the thread(s) have a larger pitch (few threads per axial distance) than fine threaded tapped holes which have a smaller pitch (more threads per axial distance). Relatively coarse threads may limit stress concentrations that may otherwise contribute to cracking. Examples of coarse threads include, but are not limited to, ACME, worm, ball, and trapezoidal threads of sufficiently coarse pitch to avoid stress concentrations. Particular desirable coarseness may be determined by longevity testing such that stress failures in the passageways do not occur over seat face lifetimes. The optimal form may depend on rotational speed of the shaft, radius of the seal interface, oil temperature and viscosity, and seal temperature at target operating conditions.

Figure 7:
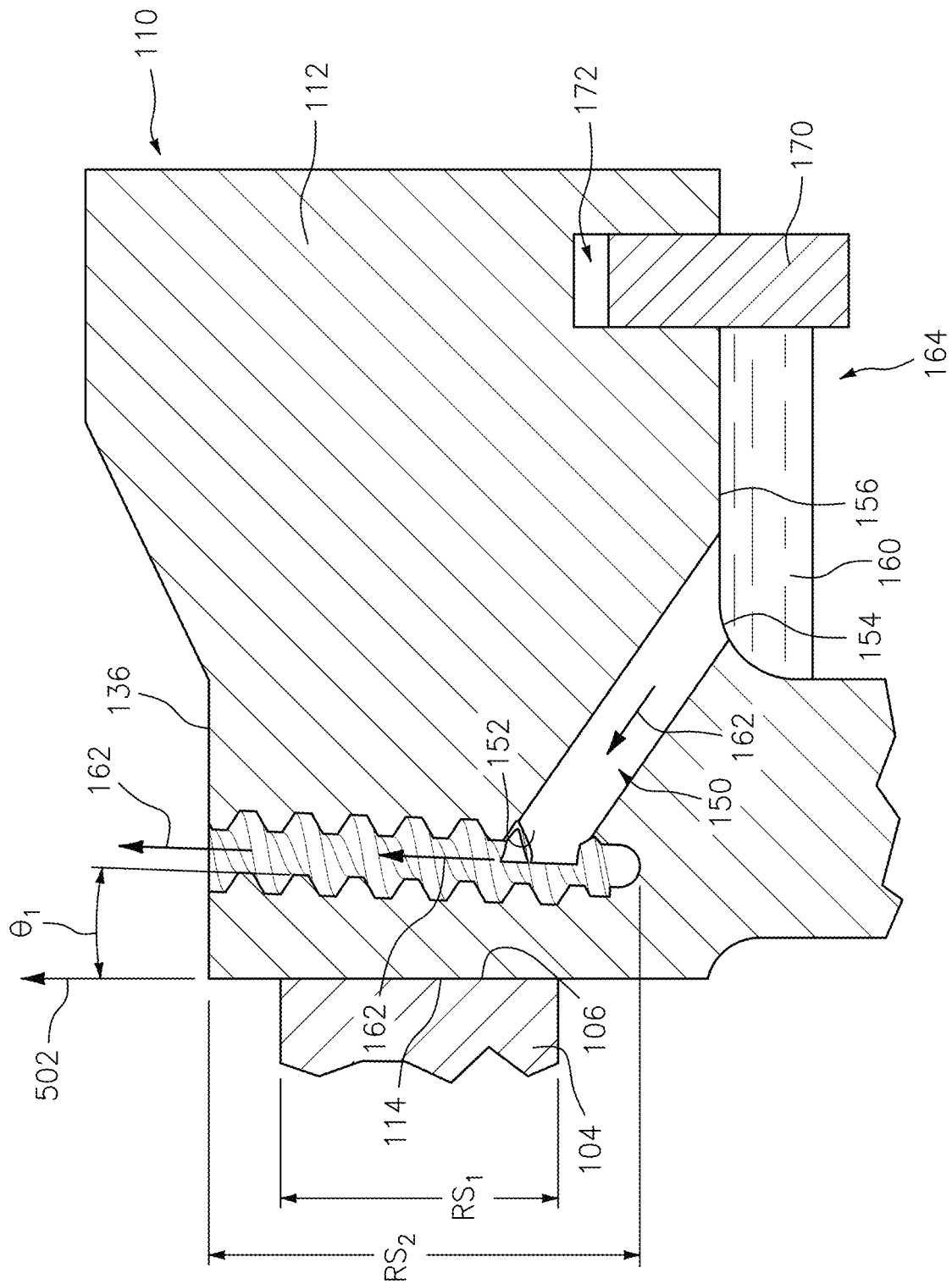
FIG. 7 is an enlarged central axial sectional view of a sixth sealing system.

Additionally, the surface enhancements may be employed in the absence of the plenum 220. FIG. 7 shows a passageway 360 having a spiral enhancement 362 similar to that of FIG. 6 but without a plenum.

Further manufacture variations include additive manufacture of the seat. This allows passageways such as non-straight passageways and/or complex enhancements to be formed with the surface enhancements. For example, the passageways may spiral in the circumferential direction.

Additional variations include seals where the oil is not delivered from a spray nozzle, but instead passes outward from a plenum (e.g., as in the '459 and '978 patents above) or via other means.

Further variations include seals where cooling fluids (particularly liquids) other than oil are used.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline seal or machine configuration, details of such baseline may influence details of particular implementations. Accordingly, other embodiments are within the scope of the following claims.

What is claimed is:

1. A seal system comprising:
a first member comprising a seal with a seal face; and
a second member comprising a seat with a seat face and a plurality of cooling passageways,
wherein:
the second member is rotatable about an axis relative to the first member;
the seal face and the seat face are in sliding sealing engagement; and
the cooling passageways have respective surface enhancements.

2. The seal system of claim 1, wherein:
each cooling passageway surface enhancement is at least one spiral.

3. The seal system of claim 2, wherein:
each cooling passageway surface enhancement is a thread.

4. The seal system of claim 1, wherein:
the second member further has a collection channel; and
the second member further has a plurality of feed passageways, each feed passageway coupling an associated said cooling passageway to the collection channel.

5. The seal system of claim 4, wherein:
each said feed passageway is positioned at an oblique angle relative to both the collection channel and the associated cooling passageway.

6. The seal system of claim 4, wherein the second member is coupled to and configured to rotate with a rotatable shaft, and wherein the first member is configured to remain stationary while the second member rotates with the rotatable shaft.

7. The seal system of claim 4, wherein:
the seal system includes between 10 and 100 cooling passageways and between 10 and 100 feed passageways.

8. The seal system of claim 4, wherein:
a distance between an outermost edge of the grooves of the threaded passageway and the seat face is between 0.76 mm and 6.35 mm; and
an angle formed between a center axis of each cooling passageway and the seat face is greater than zero.

9. The seal system of claim 4 wherein the seal system is a dry face seal, and wherein the feed passageways and cooling passageways are configured to provide cooling fluid such that the cooling fluid remains separate from an interface where the seal face and the seat face are in sliding engagement.

10. The seal system of claim 4, wherein:
each cooling passageway surface enhancement radially overlaps the seat face.

11. The seal system of claim 1, wherein:
   each cooling passageway surface enhancement radially overlaps the seat face.

12. A method for manufacturing the seal system of claim 1, the method comprising:
   forming a precursor of the second member; and
   forming of the surface enhancements by at least one of tapping and EDM.

13. The method of claim 12, further comprising:
   forming precursors of the cooling passageways by drilling.

14. A method for using the seal system of claim 1, the method comprising:
   rotating the second member about the axis relative to the first member;
   the rotation driving respective flows of fluid through the passageways; and
   the flows cooling the second member.

15. The method of claim 14, wherein:
   the surface enhancements are spiral enhancements; and
   the spiral enhancements induce swirl of the respective flows in the passageways.

16. A gas turbine engine comprising:
   an engine case, a fan, a compressor section, a turbine section, and a rotating shaft; and
   the seal system of claim 1 positioned within the compressor section of the gas turbine engine.

17. The gas turbine engine of claim 16, wherein:
   each cooling passageway surface enhancement radially overlaps the seat face.

\* \* \* \* \*